April 7, 1959  J. D. LESLIE ET AL  2,881,019
DOOR LATCH FOR A PILLARLESS AUTOMOBILE
Filed Jan. 19, 1955  5 Sheets-Sheet 1
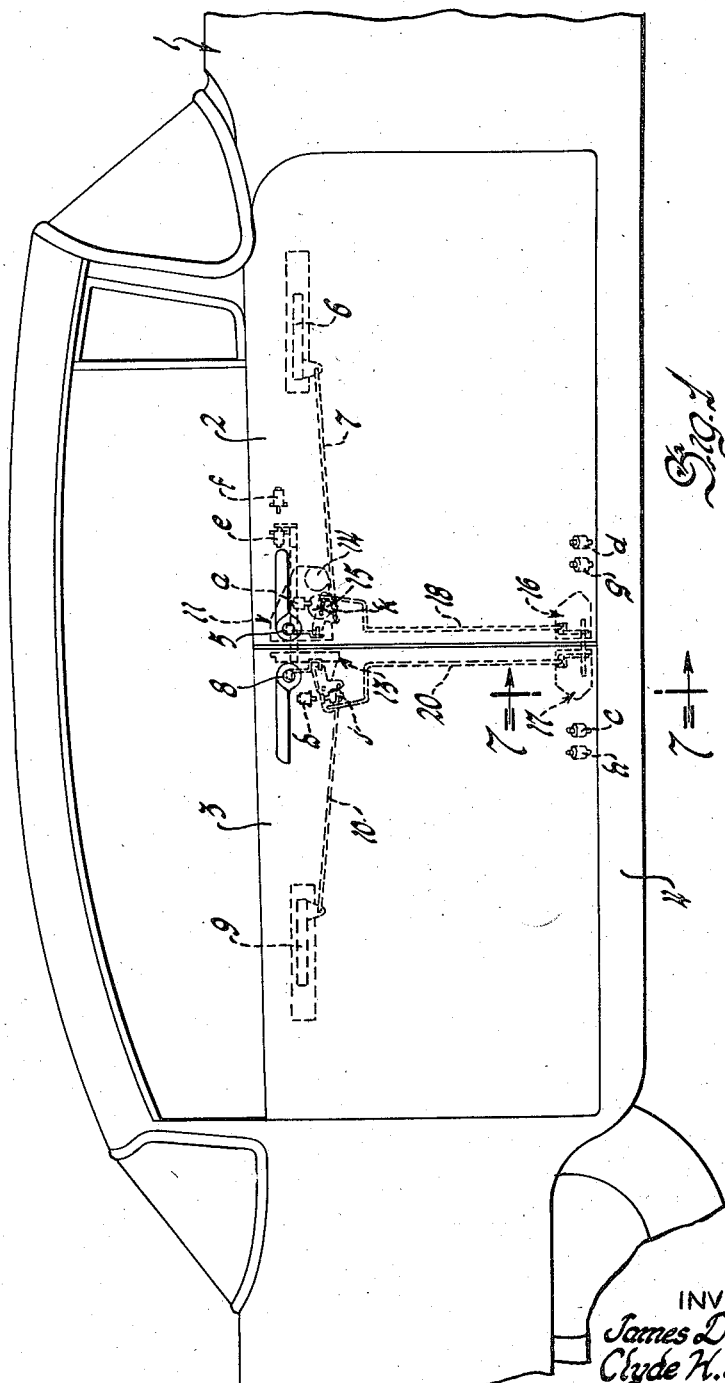
INVENTORS
James D. Leslie,
Clyde H. Schamel &
Harold E. VanVoorhees
BY
Paul Fitzpatrick
ATTORNEY

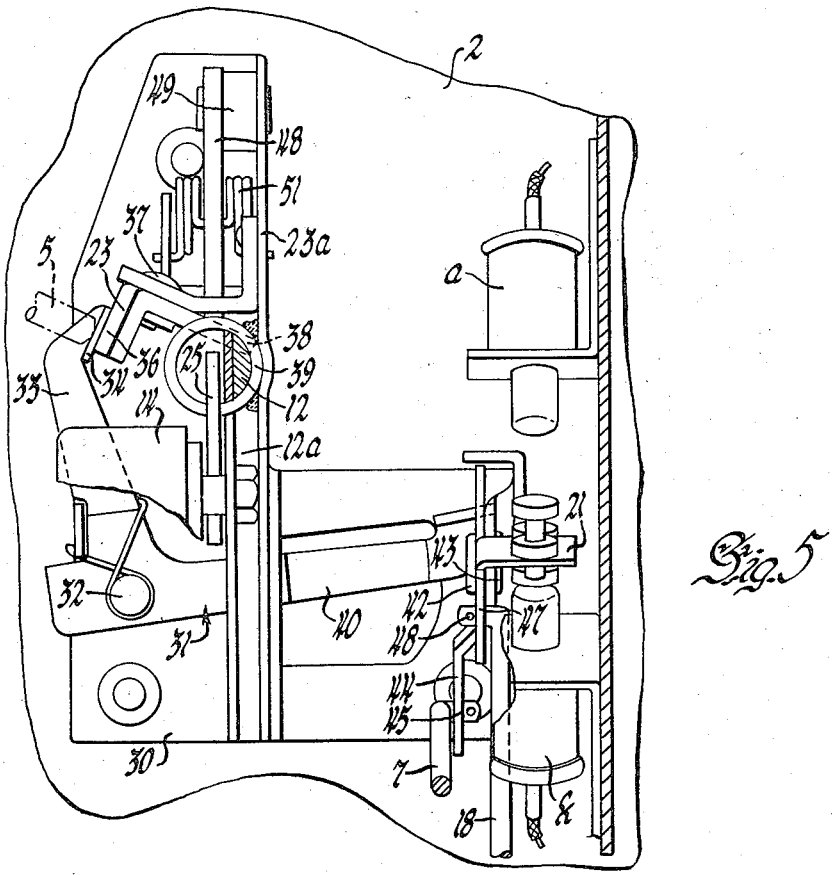
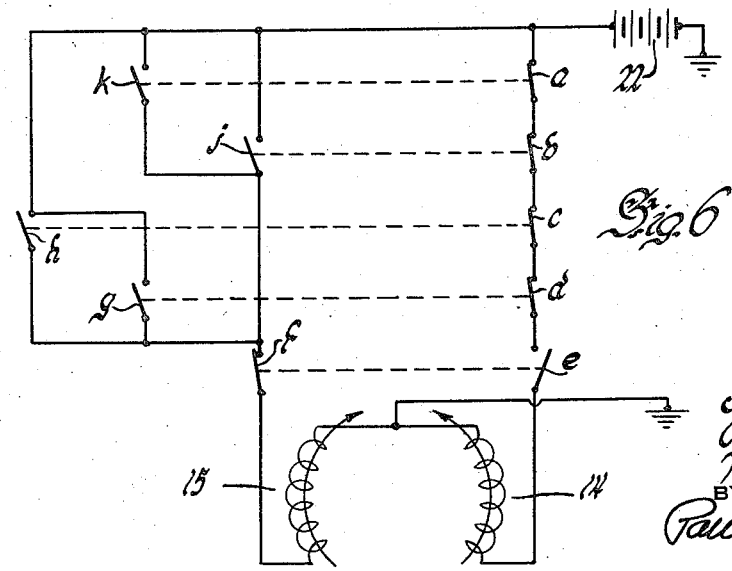

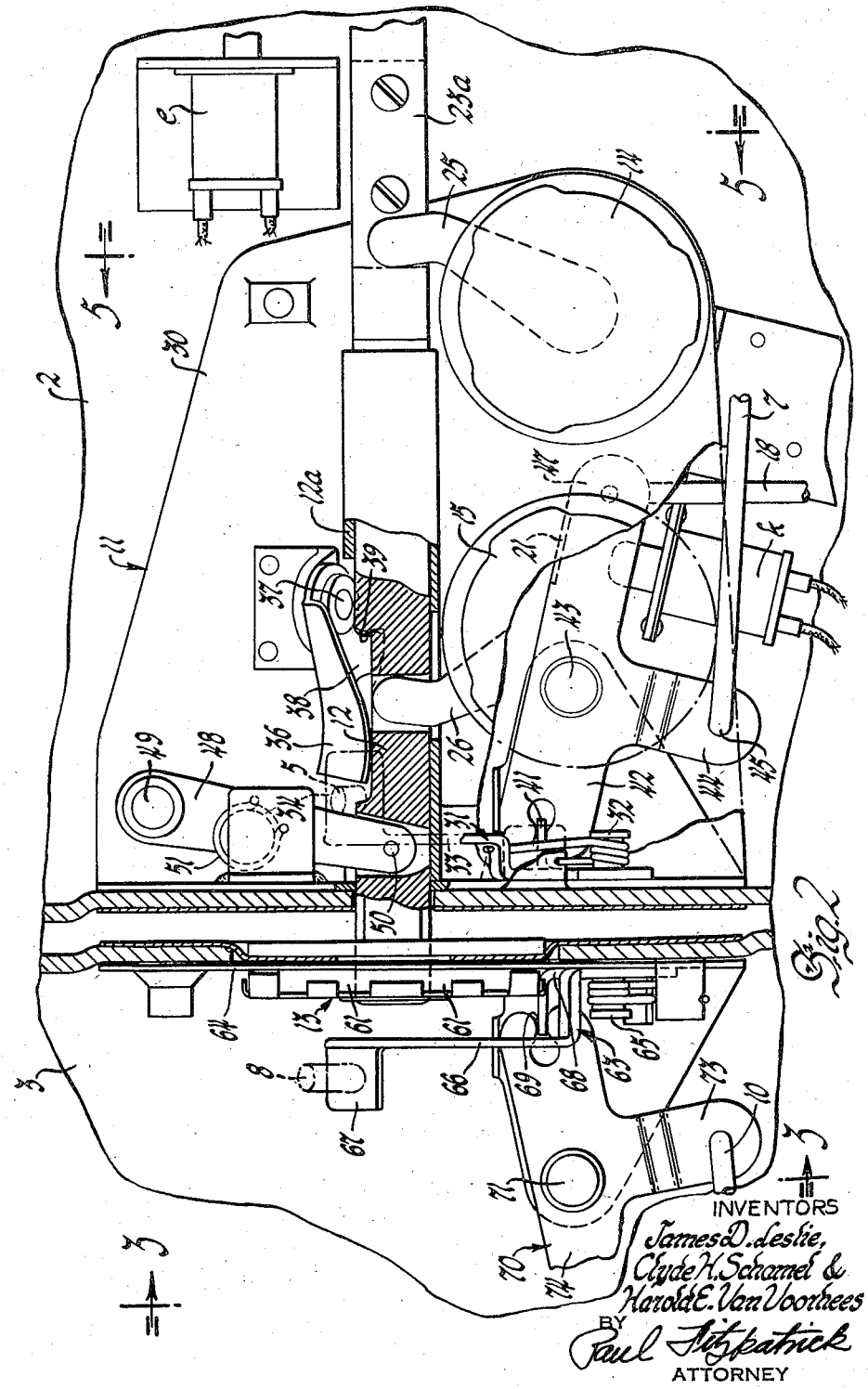

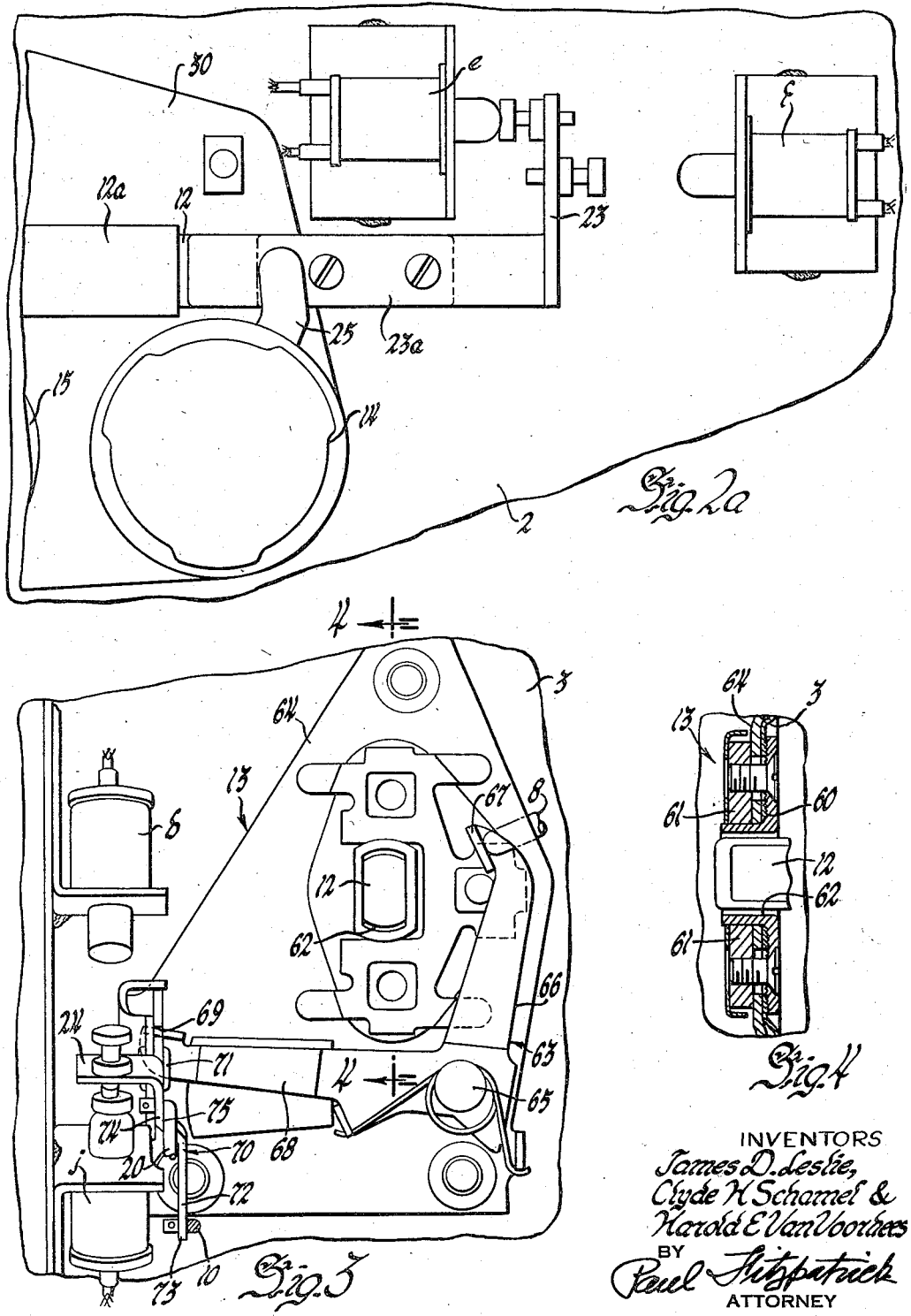

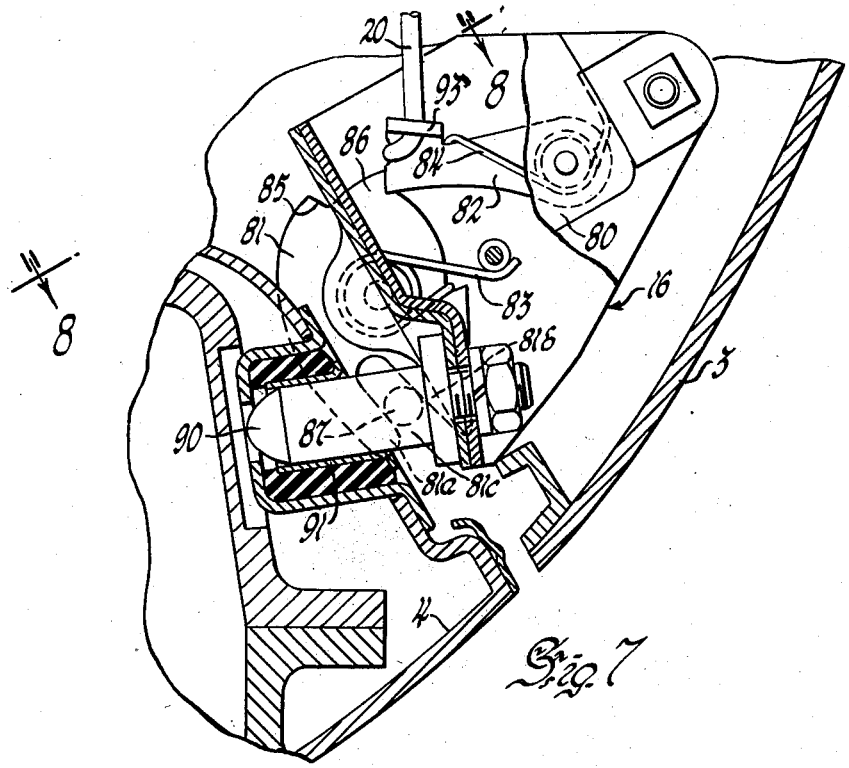
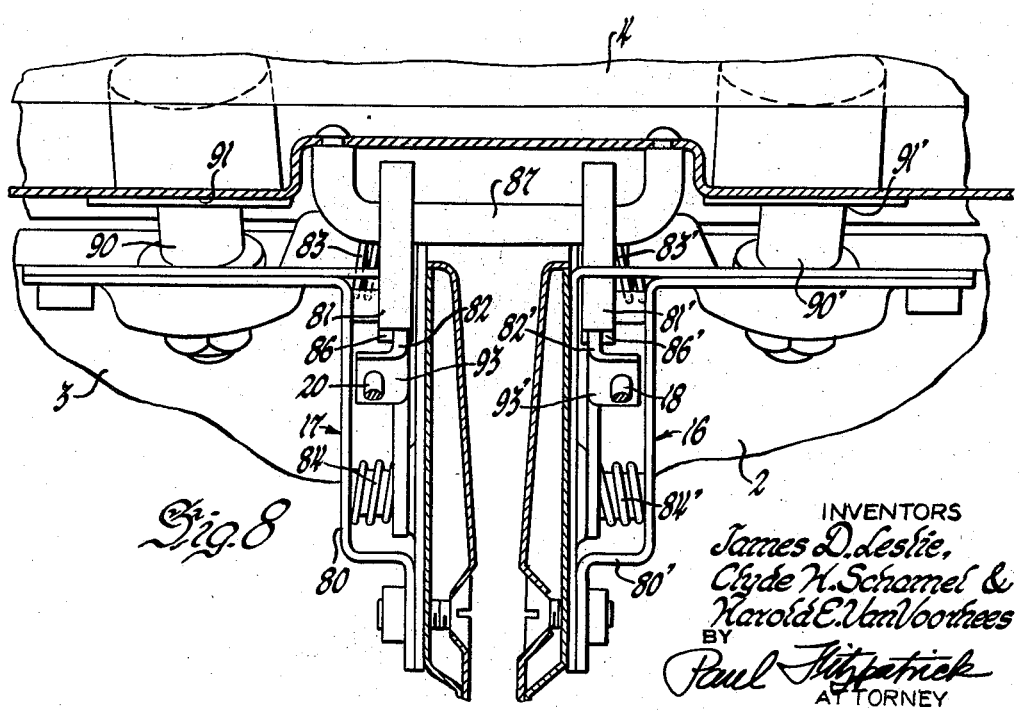

United States Patent Office 2,881,019
Patented Apr. 7, 1959

2,881,019

DOOR LATCH FOR A PILLARLESS AUTOMOBILE

James D. Leslie, Birmingham, Clyde H. Schamel, Royal Oak, and Harold E. Van Voorhees, Grosse Pointe Woods, Mich., assignors to General Motors Corporation, Detroit, Mich., a corporation of Delaware Application January 19, 1955, Serial No. 482,704

10 Claims. (Cl. 292—5)

This invention relates to automobile door latching means, and more particularly to a latching system and to a novel latch for a pillarless 4-door automobile.

One feature of the invention is that it provides improved door latching means; another feature of the invention is that it provides an improved solenoid operated latch; another feature of the invention is that it provides an improved electro-mechanical latching system for a pillarless 4-door automobile; a further feature of the invention is that it provides novel means for latching the front and rear doors to each other and to the automobile sill or rocker panel; still another feature of the invention is that it provides a latching system for a pillarless automobile, wherein the front and rear doors are latched to each other by a main latch which can be operated electrically by control means on the front and the rear door, and in which the front and rear doors are latched to the sill by subsidiary latches which are released mechanically by control means on each respective door; yet a further feature of the invention is that mechanical means are provided for releasing the main latch in the event of power failure; and still a further feature of the invention is that the latch has novel means for yieldably holding the bolt either in its extended or retracted position.

Other features and advantages of the invention will be apparent from the following description and from the drawings, in which:

Fig. 1 is a fragmentary side elevation of an automobile having the improved latching means, structure which underlies the outer panels of the automobile doors being shown in broken lines;

Fig. 2 is an enlarged vertical longitudinal section taken inside the outer front and rear door panels, the latch means being shown in side elevation and partly in section;

Fig. 2a shows a continuation of the right hand side of Fig. 2;

Fig. 3 is a view of the rear door latch operating means, looking along the line 3—3 of Fig. 2;

Fig. 4 is a vertical section through the striker, taken along the line 4—4 of Fig. 3;

Fig. 5 is a transverse section through the latch, taken along the line 5—5 of Fig. 2;

Fig. 6 is a schematic diagram of the electrical circuit for operating the latch means;

Fig. 7 is an enlarged vertical transverse section through the lower portion of the rear door and sill, taken along the line 7—7 of Fig. 1; and Fig. 8 is a section through the lower portion of the front and rear doors and the sill, showing the subsidiary latch means and taken along the line 8—8 of Fig. 12.

This door latch is particularly designed for a pillarless 4-door automobile of the type designed generally as 1 in Fig. 1. The automobile has a front door 2 hingedly mounted at its front side on the body and a rear door 3 hingedly mounted at its rear side on the body. These are so-called convertible type doors which do not have a window frame, so consequently there is no means for latching the doors to the side roof rail of the automobile. The hinge mountings for the doors may be conventional and are not illustrated. The doors 2 and 3 are latched to each other by a main latch 11, and the front door is latched at its lower rear corner to the automobile sill or rocker panel 4 by a subsidiary sill latch 16, while the rear door is latched at its lower front corner to the sill 4 by a subsidiary sill latch 17. The front door may be opened from the outside by means of a push button and rod device 5, or the door may be opened from the inside by means of a remotely located handle 6 connected to the main latch through an actuating rod 7. The rear door may be opened from the outside by means of an outside push button and rod device 8, or it may be opened from the inside by means of a remotely located inside handle 9 connected to the rear door latch operating means through an actuating rod 10.

*General description*

The front door 2 carries the main door latch 11, which latch has a solenoid operated slide bolt 12 engaging in a striker 13 on the rear door 3 to latch the front and rear doors together. A first rotary solenoid 14 is adapted to throw the latch bolt 12 to its extended latching position and a second rotary solenoid 15 is adapted to retract the bolt 12. As will appear from the description of the wiring diagram of Fig. 13, there is a latching circuit for solenoid 14 and an unlatching circuit for solenoid 15.

There is also a mechanically operated subsidiary sill latch 16 at the bottom of the front door 2 and an identical sill latch 17 at the bottom of the rear door 3. These sill latches, which are shown in Figs. 1, 7 and 8, anchor the bottom of the doors to the sill.

When the front door inner handle 6 or outer push button 7 is operated to open the door, the sill latch 16 is released mechanically through a rod 18, and at the same time a motor switch is mechanically actuated to close the circuit to the solenoid 15 to retract the latch bolt 12. There is also a mechanical release means for the latch bolt 12 so that the door can be opened in the event of power failure.

Operation of the rear door handle 9 pulls a rod 20 to trigger the rear door sill latch 17. At the same time a motor switch is mechanically closed to actuate the solenoid 15 in the front door and unlatch the rear door from the front door. There is no mechanical means for opening the rear door.

Upon closing the doors, door sill switches are actuated to energize the solenoid 14 and move the bolt to its latched position. The electrical circuit includes interlocks to prevent the main latch bolt from being moved to latched position when either door is open.

*Operating circuit*

In order to control the latching solenoid 14 and the unlatching solenoid 15, there are six single pole, single-throw switches in the front door and four single pole, single-throw switches in the rear door. The ten switches are arranged in pairs, each pair having a common actuator. In the front door adjacent the main latch 11 there is a pair of motor switches $a$ and $k$, the switch $a$ being normally closed and the switch $k$ being normally open. Normal conditions are taken to be when both front and rear doors are closed and the main latch is latched. The front door also carries a pair of solenoid limit switches $e$ (normally open) and $f$ (normally closed) and a pair of sill switches $d$ (normally closed) and $g$ (normally open). In the rear door there are a pair of motor switches b (normally closed) and J (normally open) and a pair of sill switches c (normally closed) and h (normally open). The motor switches operate the main latch 11 when one of the doors is opened by front or rear inner or outer operating handle or push button; the limit switches de-energize the operating solenoid when the cycle is completed; and the sill switches operate the latch when the door is slammed shut and also provide an interlock to prevent latching operation of the bolt 12 unless both doors 2 and 3 are closed so that the bolt and striker are in their proper interengaging positions.

Assuming both doors to be closed, which is the condition shown in the wiring diagram of Fig. 6, the front door 2 can be opened by either its inside handle 6 or by its outside push button 5. Manipulation of either the handle or the push button pulls up on rod 18 to trigger the bolt in sill lock 16 and release this bolt from latching engagement with its striker. At the same time, an actuator 21 (Fig. 5) on the door control mechanism swings upwardly to open switch a in the latching circuit and close switch k in the retracting circuit. In Fig. 6 the latching circuit comprises that portion of the diagram located at the right of the drawing and connected to the solenoid 14, and the retracting circuit comprises that portion of the diagram located at the left of the drawing and connected to the solenoid 15. Both circuits are connected to the automobile battery 22.

It should be noted that when the manual door control means is released, the actuator 21 returns to its original position of Fig. 5 and switches a and k are returned to their normal condition which is illustrated in the wiring diagram. When the actuator 21 closes switch k, a retracting circuit is completed through motor switch k and limit switch f to energize solenoid 15 so that its arm 24 rotates through an arc in a counterclockwise direction (see Fig. 2) to retract the bolt 12. When the door is manually pulled open, sill switch d in the latching circuit is opened and sill switch g is closed, this latter switch providing a holding circuit around switch k so that the solenoid 15 remains energized even though the rod 18 and actuator 21 return to their normal positions as shown in the drawing. When the bolt 12 is fully retracted, an actuator 23, which is carried by an extension 23a on the bolt, closes limit switch e and opens limit switch f, this latter switch breaking the circuit to solenoid 15.

When the front door 2 is slammed shut (assuming the rear door 3 to be shut), sill switches d and g are returned to the condition shown in the wiring diagram, switch d being closed and switch g being open. Since the solenoid limit switch e is now held closed by the actuator 23 on the bolt, and since motor switch a is now closed by the earlier movement of the actuator 21 to the position shown in Fig. 5 of the drawings, a circuit is closed through switches a, b, c, d and e to energize solenoid 14 and move the bolt back to its latching position. When the bolt reaches latching position, the actuator 23 is in the position shown in Fig. 2a and opens switch e and closes switch f.

In order to open the rear door, either the inside or outside rear door operating mechanism may be manipulated to pull up on rod 20, which rod is connected to and mechanically triggers sill latch 17. At the same time, an actuator 24 (Fig. 3) on the rear door control mechanism opens switch b in the latching circuit of solenoid 14 and closes switch j in the retracting circuit, thereby energizing solenoid 15 to retract the bolt 12. When the bolt reaches its retracted position, the actuator 23, which is carried by the bolt, opens limit switch f and closes limit switch e. When the rear door is pulled away from the rocker panel, rear sill switch c in the latching circuit is opened and rear sill switch h in the retracting circuit is closed, this latter switch providing a holding circuit around the motor switch j so that the solenoid 15 continues to be energized even though the actuator 24 is returned to its normal position when the rear door manual operating mechanism is released.

When the rear door is slammed shut (assuming the front door to be closed), sill switch h is opened and sill switch c is closed, this latter switch completing a latching circuit through solenoid 14 to move the bolt 12 to latched position.

Since the bolt 12 latches the front door 2 to the rear door 3, the bolt must remain retracted so long as either door is open. Assuming both doors to be open and the front door to be slammed shut, the sill switch c in the rear door will still be open so that solenoid 14 cannot be energized despite the fact that all of the other switches in the latching circuit to this solenoid are closed. Now, when the rear door is closed, sill switch c will close and solenoid 14 will be energized.

*Main latch*

The main latch 11, which is illustrated in Figs. 2, 2a and 5, has a frame 30 upon which the bolt 12 is slidably mounted in a hollow casing 12a. Solenoids 14 and 15 are carried on the latch frame 30, arm 26 of solenoid 15 being used to retract the bolt as the arm rotates through an arc in a clockwise direction from its location shown in Fig. 2, and arm 25 of solenoid 14 being used to throw the bolt to its extended or latched position when the arm rotates in a counterclockwise direction to its location shown in Figs. 2 and 2a.

In addition to the electrical actuating means, there is also a mechanical actuating means so that the front door can be opened in the event of power failure. A bell crank 31 is pivoted on the jamb face of the frame 30 at 32 and has an upwardly extending arm 33 terminating in a tab 34 adapted to be engaged by the push button rod 5. The tab 34 overlies an arm 36 of a release lever pivoted at 37 and having another arm 38 which engages a shoulder 39 on the bolt. Operation of the outside push button pivots the bell crank 31 in clockwise direction as the parts appear in Fig. 5, causing the release lever arm 38 to cam the bolt to its retracted position.

As shown in Figs. 2 and 5, the bell crank 31 has another arm 40 which extends toward the inner door panel and is pivotally connected at 41 to a remote lever 42 pivotally mounted at 43. This remote lever carries the switch actuator 21, and the lever has an arm 44 which is connected at 45 to the remote actuating rod 7 extending to the inside remote handle 6, and another arm 47 which is connected at 48 to the sill latch operating rod 18. By virtue of this arrangement, the latch bolt 12 may be retracted mechanically from inside or outside the car in the event of power failure, and the sill latch 16 is always released upon the operation of the inside or outside door opening device.

In order to assist the bolt 12 in its movements between latched and unlatched positions and to provide a yieldable holding device to hold it in either selected position, there is a lever 48 pivoted on the frame 30 at 49 and pivotally connected at 50 to the bolt 12. An overcenter spring 51 yieldably holds the bolt in either extended or retracted position.

*Rear door latch actuating means*

The striker 13 shown in Figs. 2, 3 and 4 merely comprises plates 60 and 61 on a frame 64, the members 60, 61 and 64 having a generally rectangular opening 62 to receive the end of the latch bolt 12. No parts of the striker are movable. However, this assembly does include a switch actuating release mechanism for the main latch and a mechanical release means for the rear sill latch. There is a bell crank 63 pivoted on the striker frame 64 at 65 and having an upwardly extending arm 66 with a tab 67 for operation by the rear door outside push button rod 8. Another arm 68 of this bell crank extends towards the inner door panel and is pivotally connected in a slot 69 of a remote lever 70 which is pivotally mounted on the frame 64 at 71. The lever 70 has an arm 72 connected at 73 to the remote actuating rod 10 extending to the inside handle 9, and the lever 70 has another arm 74 connected at 75 to the operating rod 20 for the sill latch 17. The operation of the rear door inner or outer opening means mechanically releases the sill latch 17 and electrically releases the main latch 11. There is no mechanical means for operating the main latch 11 from the rear door.

Sill latch

The sill latches 16 and 17 shown in Figs. 7 and 8 are identical and only the rear door latch 17 will be described in detail. The same reference characters with a prime ( ' ) designate corresponding parts in the front door latch 16. The latch frame 80, which is mounted on the door, carries a pivoted bolt 81 and a pivoted detent 82. The bolt is bifurcated, having fingers 81a and 81b spaced by a latching recess 81c. A spring 83 urges the bolt towards unlatched position, and a spring 84 urges the detent towards engagement with latching teeth 85 and 86 on the bolt. The lower end of rod 20 (or 18 in the front door) is connected to a tab 93 on the detent 82. When the rod 20 is moved upwardly, it releases the detent 82 and permits the bolt to swing to unlatched position.

The striker is carried on the sill 4 and is formed as a U as shown at 87 in Fig. 8. The bolts for both latches 16 and 17 engage this same U-shaped striker. There is also a dovetail dowel 90 carried by the door. This dovetail enters a recess 91 in the sill to hold the door in position when the door is closed.

While we have shown and described one embodiment of our invention, it is capable of many modifications. Changes, therefore, in the construction and arrangement may be made without departing from the spirit and scope of the invention as set forth in the appended claims.

We claim:

1. A door latching system for a pillarless automobile having a body with front and rear doors, the free edges of which lie closely adjacent each other when the doors are closed, comprising: a main latch on one door; a striker on the other door, said latch engaging in said striker to latch the doors together when the doors are closed; at least one solenoid for operating the main latch; a subsidiary latch on each one of said doors for latching that door to the body; single control means on the front door for the main latch and the front door subsidiary latch; and single control means on the rear door for the main latch and the rear door subsidiary latch.

2. A door latching system for a pillarless automobile having a body with front and rear doors, the free edges of which lie closely adjacent each other when the doors are closed, comprising: a main latch on one door having a bolt movable between latched and unlatched positions; a striker on the other door, said bolt engaging in said striker to latch the doors together when the doors are closed; a first solenoid for moving the bolt to unlatched position; a second solenoid for moving the bolt to latched position; a subsidiary latch on each one of said doors for latching that door to the body; single control means on the front door for the main latch and the front door subsidiary latch; and single control means on the rear door for the main latch and the rear door subsidiary latch.

3. A door latching system for a pillarless automobile having a body with front and rear doors, the free edges of which lie closely adjacent each other when the doors are closed, comprising: a main latch on the front door, said latch having a bolt movable between latched and unlatched positions; a striker on the rear door, the bolt engaging in said striker to latch the doors together when the doors are closed; a first solenoid for moving the bolt to unlatched position; a second solenoid for moving the bolt to latched position; energizing circuits for said solenoids; a subsidiary latch on each of said doors for latching each door to the body; first control means on the front door, including a common actuator for energizing said first solenoid and for actuating the mechanical operating means for the front subsidiary latch; and second control means on the rear door, including a common actuator for energizing said first solenoid and for actuating the mechanical operating means for the rear subsidiary latch.

4. A door latching system for a pillarless automobile having a body with front and rear doors, the free edges of which lie closely adjacent each other when the doors are closed, comprising: a main latch on the front door, said latch having a bolt movable between latched and unlatched positions; a striker on the rear door, the bolt engaging in said striker to latch the doors together when the doors are closed; a first solenoid for moving the bolt to unlatched position; a second solenoid for moving the bolt to latched position; energizing circuits for said solenoids; a subsidiary latch on each of said doors for latching each door to the body; first control means on the front door, including a common actuator for energizing said first solenoid and for actuating the mechanical operating means for the front subsidiary latch; second control means on the rear door, including a common actuator for energizing said first solenoid and for actuating the mechanical operating means for the rear subsidiary latch; and door operated switch means in the energizing circuit for said second solenoid preventing energization of said solenoid to move the bolt to latched position when either door is open.

5. A door latching system for a pillarless automobile having a body with front and rear doors, the free edges of which lie closely adjacent each other when the doors are closed, comprising: a main latch on the front door, said latch having a bolt slidable between latched and unlatched positions; a striker on the rear door, said bolt engaging in said striker to latch the doors together when the doors are closed; a first solenoid for moving the bolt to unlatched position; a second solenoid for moving the bolt to latched position; energizing circuits for said solenoids; a subsidiary latch on each of said doors for latching each door to the body; mechanical means for operating each subsidiary latch; manually operable means for moving said bolt to unlatched position; first control means on the front door, including a common actuator for energizing said first solenoid and for actuating the mechanical operating means for the front subsidiary latch; and second control means on the rear door, including a common actuator for energizing said first solenoid and for actuating the mechanical operating means for the rear subsidiary latch.

6. A door latching system for a pillarless automobile having a body with front and rear doors, the free edges of which lie directly adjacent each other when the doors are closed, comprising: means for latching the doors to each other adjacent their free edges; at least one solenoid for operating the latching means; mechanically operated means for latching each door to the body adjacent the free swinging edge of each door; single control means having an operator on the front door only for energizing said solenoid to unlatch the doors from each other and simultaneously mechanically unlatching the front door from the body; and single control means having an operator on the rear door only for energizing said solenoid to unlatch the doors from each other and simultaneously unlatching the rear door from the body.

7. A door latching system for a pillarless automobile having a body with front and rear doors, the free edges of which lie directly adjacent each other when the doors are closed, comprising: means for latching the doors to each other adjacent their free edges, including a bolt carried by one door for engagement with a keeper carried by the other door, said bolt being movable between latched and unlatched positions; at least one solenoid for moving the bolt between latched and unlatched positions; an energizing circuit for said solenoid; and interlocking switch means in said circuit operable by either door to break said circuit and prevent energization of said solenoid to operate the bolt to latched position when either door is open, said bolt, when in latched position, lying in the path of closing movement of the free swinging edge of the door which carries the striker.

8. A door latch of the character described, including: a frame; a bolt mounted on said frame for movement between latched and unlatched positions; first motor means connected directly to the bolt for moving the bolt to latched position; second motor means connected directly to the bolt for moving the bolt to unlatched position; and separate means on said frame yieldably releasably holding said bolt in either of said positions, comprising a link swingably mounted on the frame and connected directly to the bolt at a location spaced from the connection of each of said motor means and an overcenter spring connected between the frame and the link; the link swinging to throw the spring over dead center when the bolt moves between latched and unlatched positions.

9. A door latch of the character described, including: a frame; a bolt mounted on said frame for slidable movement between latched and unlatched positions; first motor means including a first operating arm connected to the bolt for sliding it to latched position; second motor means including a second operating arm connected to the bolt for sliding it to unlatched position; and separate means on said frame yieldably releasably holding said bolt in either of said positions, comprising a link swingably mounted at one end on the frame and movably connected at its other end to the bolt at a location spaced from the connection of each of said operating arms and an overcenter spring connected between the frame and an intermediate portion of the link, the link swinging to throw the spring over dead center when the bolt moves between latched and unlatched positions.

10. A door latch of the character described, including: a frame; a bolt mounted on said frame for slidable movement between latched and unlatched positions; first motor means comprising a solenoid having an operating arm connected directly to the bolt for sliding the bolt to latched position; second motor means comprising a second solenoid having an operating arm connected directly to the bolt for sliding the bolt to unlatched position; and separate means on said frame yieldably releasably holding said bolt in either of said positions, comprising a link swingably mounted on the frame and movably connected to the bolt at a location spaced from the connection of each of said operating arms and an overcenter spring connected between the frame and the link, the link swinging to throw the spring over dead center when the bolt moves between latched and unlatched positions.

References Cited in the file of this patent

UNITED STATES PATENTS

| | | |
|---|---|---|
| 279,334 | Clark | June 12, 1883 |
| 1,346,670 | Page | July 13, 1920 |
| 1,435,971 | Mueller | Nov. 21, 1922 |
| 1,635,028 | Burr | July 5, 1927 |
| 1,776,265 | Martel | Sept. 23, 1930 |
| 1,869,274 | Phillips | July 26, 1932 |
| 2,160,011 | Beck | May 30, 1939 |
| 2,234,810 | Simpson | Mar. 11, 1941 |
| 2,363,364 | Rugg | Nov. 21, 1944 |
| 2,650,846 | Allen | Sept. 1, 1953 |